(No Model.)

J. W. MacDONALD.
ICE CREAM FREEZER.

No. 489,565. Patented Jan. 10, 1893.

Witnesses:
Frank Zink
Ephraim E. Sheats

J. W. MacDonald
Inventor.

THE NORRIS PETERS CO., PHOTO-LITHO., WASHINGTON, D. C.

UNITED STATES PATENT OFFICE.

JOHN W. MacDONALD, OF PITTSBURG, PENNSYLVANIA.

ICE-CREAM FREEZER.

SPECIFICATION forming part of Letters Patent No. 489,565, dated January 10, 1893.

Application filed March 18, 1892. Serial No. 425,498. (No model.)

*To all whom it may concern:*

Be it known that I, JOHN W. MACDONALD, of Pittsburg, Pennsylvania, have invented an Improvement in Devices for Freezing Milk and other Liquids, which consists, essentially, in a means for regulating the operation of feeding the liquid to be frozen to the machine, the object being to provide a machine of this class that will be easy of operation and produce an evenly-frozen ice, of which the following is a specification.

Figure 1:
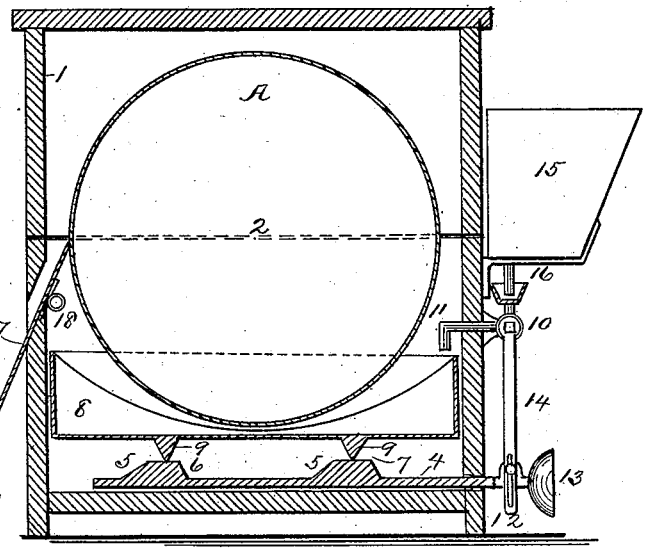
Figure 3:
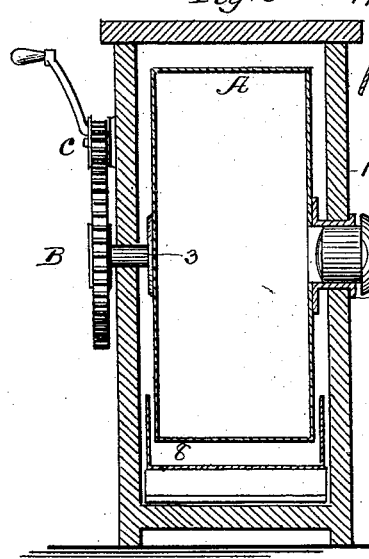
Figure 2:
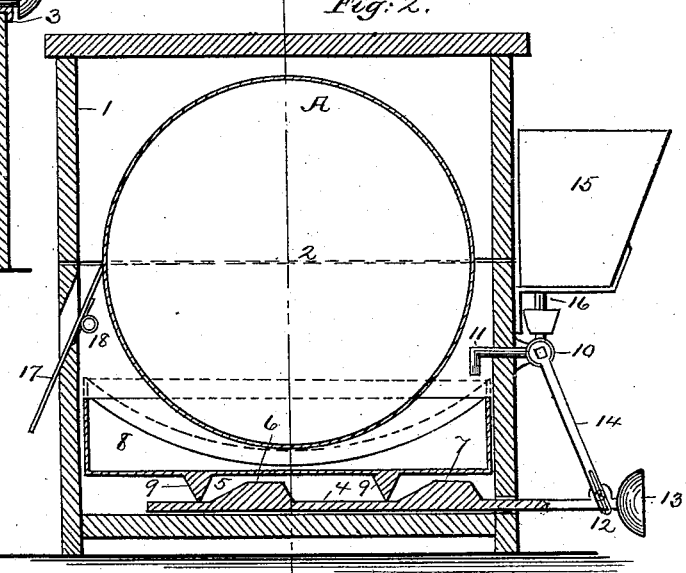

Figure 1 is a vertical sectional view of machine when in operation. Fig. 2 is a like view when at rest. Fig. 3 is a transverse sectional view through dotted line in Fig. 2.

To construct said device a case 1 of wood or suitable material is formed in two parts divided on line 2. An ice reservoir A of a well known type is provided having trunnions 3, one of which is made hollow to admit ice to the reservoir, A, the other being solid and having fitted thereto a cogged wheel, B which engages with a smaller wheel C, carrying a crank D, and journaled to the outside of case 1. Said reservoir A, is placed inside of case 1 being supported by the sides thereof, which are cut away to admit the trunnions 3. Upon the bottom of case 1, is fitted a sliding framework 4 having inclined surfaces 5 and resting planes 6 and 7. A pan 8 of a size to be readily moved up and down within the case 1, is formed from tin and provided upon its under side with lugs 9. To one end of case 1, is attached a two-way valve 10 with the inlet opening thereof pointing upward, which latter is provided with a flexible lining. The discharge from said valve being by way of pipe 11, which passes through case 1, emptying into pan 8. Resting upon suitable brackets at one end of case 1, and placed so as to be immediately above valve 10 is a removable reservoir 15 provided with a depending tube 16, which enters the inlet of the valve 10. Extending from sliding frame 4 and passing through case 1, is a shaft 12 provided with a handle 13. To the plug of the valve 10 is attached a lever 14 which extends down to and connects with the shaft 12 by a wrist bolt. To one end of case 1, opposite that to which is placed reservoir 15 is attached an adjustable scraper, 17, one end of which rests under pressure of a spring 18, against the face of cylinder A, the other end passing through an opening in case 1, to the outside.

To put said improvement into operation the cylinder A, having been charged with freezing material and being in position, the handle 13, is pulled to position shown in Fig. 2 closing valve 10. The liquid to be frozen may now be placed in reservoir 15 from which it will flow through tube 16, between which tube and valve 10 a close joint is formed by a flexible lining in the valve inlet. This arrangement admits of the parts being easily separated for convenience of cleaning. The cylinder A may now be put in motion and the handle 13, pushed into position shown in Fig. 1, whereby the valve 10 is opened permitting the liquid in reservoir 15 to flow by way of pipe 11 into pan 8. The same movement of handle moves frame 4, carrying inclines 5 forward, and under the lugs 9 causing the pan 8 to rise, thereby carrying the liquid in the pan into contact with the cylinder A, where it remains as long as the machine is in operation. The liquid to be frozen is now flowing into pan 8 from where it at once passes to the surface of the revolving freezing cylinder A, and from which it is in turn taken in a frozen state by the scraper 17, and carried to the outside of the machine. It will be seen that after the pan 8 is raised to the plane 7, some little motion can be given to the handle 13 and lever 14 without changing the height of the pan. This admits of opening of valve 10 much or little according as the material to be frozen is required to be fed fast or slow. If the motion of the cylinder A, be stopped while in contact with the liquid in the pan, the liquid will at once be taken up by the cylinder A, at the point of contact and soon form in a solid mass, and thereby prevent further operation of the machine unless the freezing cylinder A, be emptied and the mass of frozen liquid on the surface be removed. It is consequently most important that any irregularity in the freezing be prevented. To this end, when it is desired to cease operations for an interval the handle 13 is drawn out, whereby the valve 10 is closed, the flow of liquid is shut off from the pan 8 and the latter dropped back to position shown in Fig. 2, carrying with it and away from cylinder A, whatever liquid may be in it. Thus it will be seen that the freezing cylinder A, is entirely clear of the liquid and will remain so until the operator by the simple movement of the handle 13, again brings the machine to a position to continue its operation.

What I claim is—

In a device for freezing liquids the combination of a revolving freezing cylinder and a feed pan therefor, a frame placed beneath said pan for supporting the same adapted to move horizontally on a line parallel with the length of said feed pan, carrying inclines so arranged thereon with reference to their line of inclination that the pan will be raised and lowered according as said frame is moved backward and forward, a feed valve for regulating supply to said pan and a rod connecting said valve and movable frame whereby said valve is opened and closed by the same movements of the frame that raises and lowers the feed pan as set forth and described.

In testimony whereof witness my hand this 23d day of February, A. D. 1892.

J. W. MacDONALD.

Witnesses:
H. D. GAMBLE,
J. G. BELL.